(12) United States Patent
Reynders et al.

(10) Patent No.: US 7,152,113 B2
(45) Date of Patent: Dec. 19, 2006

(54) EFFICIENT SYSTEM AND METHOD OF NODE AND LINK INSERTION FOR DEADLOCK-FREE ROUTING ON ARBITRARY TOPOLOGIES

(75) Inventors: John V. Reynders, Newton, MA (US); Radia J. Perlman, Acton, MA (US); Guy L. Steele, Jr., Lexington, MA (US); Dah Ming Chiu, Acton, MA (US); Miriam C. Kadansky, Westford, MA (US); Murat Yuksel, Troy, NY (US)

(73) Assignee: Sun Microsystems, Inc., Santa Clara, CA (US)

(*) Notice: Subject to any disclaimer, the term of this patent is extended or adjusted under 35 U.S.C. 154(b) by 783 days.

(21) Appl. No.: 10/027,886

(22) Filed: Oct. 19, 2001

(65) Prior Publication Data

US 2003/0172180 A1 Sep. 11, 2003

(51) Int. Cl.
*G06F 15/16* (2006.01)
*G06F 15/173* (2006.01)

(52) U.S. Cl. ............. 709/238; 709/203; 709/242

(58) Field of Classification Search ............ 709/202, 709/203, 208, 218, 226, 227, 229, 239, 242, 709/238, 240

See application file for complete search history.

(56) References Cited

U.S. PATENT DOCUMENTS

| | | | |
|---|---|---|---|
| 5,138,615 A * | 8/1992 | Lamport et al. | 370/400 |
| 5,453,978 A | 9/1995 | Sethu et al. | |
| 5,491,690 A * | 2/1996 | Alfonsi et al. | 370/404 |
| 5,535,195 A * | 7/1996 | Lee | 370/256 |
| 5,732,072 A * | 3/1998 | Thanner et al. | 370/255 |
| 5,781,531 A * | 7/1998 | Charny | 370/232 |
| 5,881,246 A * | 3/1999 | Crawley et al. | 709/238 |
| 6,047,331 A * | 4/2000 | Medard et al. | 709/239 |
| 6,098,107 A * | 8/2000 | Narvaez-Guarnieri et al. | 709/239 |
| 6,134,599 A * | 10/2000 | Chiu et al. | 709/252 |
| 6,466,779 B1 * | 10/2002 | Moles et al. | 455/410 |
| 6,614,764 B1 * | 9/2003 | Rodeheffer et al. | 370/254 |
| 6,631,421 B1 | 10/2003 | Steele et al. | |
| 6,647,427 B1 * | 11/2003 | Watanabe | 709/239 |
| 6,658,481 B1 * | 12/2003 | Basso et al. | 709/243 |
| 6,678,241 B1 | 1/2004 | Gai et al. | |
| 6,704,320 B1 * | 3/2004 | Narvaez et al. | 370/408 |
| 6,711,623 B1 * | 3/2004 | Furukawa et al. | 709/249 |
| 6,765,880 B1 | 7/2004 | Hillard et al. | |
| 6,804,199 B1 * | 10/2004 | Kelly et al. | 370/238 |
| 6,845,091 B1 * | 1/2005 | Ogier et al. | 370/338 |
| 7,007,101 B1 * | 2/2006 | Schwaderer | 709/238 |

(Continued)

*Primary Examiner*—Ario Etienne
*Assistant Examiner*—Sargon N. Nano
(74) *Attorney, Agent, or Firm*—Chapin IP Law, LLC; Barry W. Chapin, Esq.

(57) ABSTRACT

A system and method for adding routing information for a node to a routing table, which efficiently makes necessary changes to the routing table to support routing to and from the node, while maintaining the deadlock-free quality of the paths described by the routing table. The routing table is generated by storing routing information in the routing table that reflects and describes a deadlock-free set of paths through a network of nodes. A row of entries is added to the routing table describing how to forward data units from the node. A column of entries is added to the routing table describing how to forward data units addressed to the node. The forwarding information within each entry added to the routing table maintains the deadlock-free quality of the set of paths represented by the forwarding table.

16 Claims, 10 Drawing Sheets

U.S. PATENT DOCUMENTS

| | | | |
|---|---|---|---|
| 7,016,313 B1 * | 3/2006 | Harper | 370/254 |
| 2002/0042274 A1 | 4/2002 | Ades | |
| 2002/0073338 A1 | 6/2002 | Burrows et al. | |
| 2002/0141346 A1 | 10/2002 | Garcia-Luna-Aceves et al. | |
| 2003/0140165 A1 | 7/2003 | Chiu et al. | |
| 2003/0172180 A1 | 9/2003 | Reynders et al. | |

* cited by examiner

EFFICIENT SYSTEM AND METHOD OF NODE AND LINK INSERTION FOR DEADLOCK-FREE ROUTING ON ARBITRARY TOPOLOGIES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to routing of data through a communications network, and more specifically to a system and method for node and link insertion to provide deadlock-free routing on arbitrary topologies.

As it is generally known, routing is the process of determining the nodes through which a data unit is forwarded along its path between a source and a destination within a network. The route taken by data, such as a packet or other specific type of data unit, is also referred to herein as the path taken between the source and destination. Routing is performed by various kinds of data forwarding devices, including routers and switches. A forwarding device that performs routing is typically connected to multiple communication links, and operates to select at least one of those communication links as an output link for each received data unit to be forwarded. Thus it is seen that routing in general is concerned with determining which paths are used for forwarding data units through a network.

Existing routing systems employ routing tables that define the routes to be taken between nodes within a network. An example of a routing table 10 is shown in FIG. 1. As shown in FIG. 1, the routing table 10 includes a number of rows 12 and a number of columns 14. Each of the rows 12 contains next hop forwarding information for a corresponding source node in the network. The routing table 10 includes routing information for N nodes. The row indices for the routing table 10 are thus associated with nodes making a forwarding decision ("source" nodes) regarding one or more data units they have received, and the column indices for the routing table 10 are associated with destination nodes to which those data units are addressed and ultimately delivered ("destination" nodes).

Information within a routing table entry having indices Row_Index and Column_Index describes how a node associated with Row_Index should forward a data unit addressed to a destination node associated with Column_Index. For example, considering a hypothetical network including a node X and a node Y, row $R_3$ 16 may be used to store forwarding information to be used by a corresponding node X. Accordingly, each entry in row $R_3$ 16 would contain forwarding information to be used when forwarding data units received by node X. Data units received by node X and having a destination address indicating node Y, for example, would be forwarded by node X based on forwarding information contained in a forwarding table entry located using a column index corresponding to node Y, shown for purposes of illustration as column index $C_2$ 18. As a result, as illustrated in FIG. 1, node X would reference the forwarding information contained in the routing table entry 20. Such forwarding information would, for example, indicate an outgoing link from node X onto which the received data unit should be forwarded, as well as any other information needed to forward the data unit to a next node along its path to node Y. Each forwarding table entry may further include information describing the cost of such a next hop defined by forwarding information within the entry. Such cost information may reflect distance, delay, or other costs associated with forwarding a received data unit according to the forwarding information within the routing table entry.

During operation of existing systems, the contents of each row within the routing table 10 are typically forwarded to its corresponding source node within the network. As described above, each row within the routing table 10 serves as a "forwarding table" for its corresponding node, providing the routing information needed by that node to forward the data units it receives. As illustrated in FIG. 1, row $R_3$ 16 would therefore be forwarded to node X, to serve as the forwarding table for node X.

Generation of a complete routing table such as the routing table 10 in FIG. 1, and distribution of the rows within the routing table as forwarding tables to nodes within the network, are costly procedures which consume valuable resources and may adversely impact network performance. When a new node is added to a network, it is desirable to make as few changes to the routing table as possible, in order to minimize the forwarding tables (rows) that need to be transmitted over the network.

Traditional routing systems have also attempted to compute paths that do not contain loops. However, even where loop-free paths have been determined, traffic flows can interact with each other to cause a problem known as "deadlock" within the network. For example, deadlock can occur within a group of switches, each of which has buffers full of received data, and cannot drop any packet from its buffer. Each of the switches in such a group may be unable to forward its received data because the switch to which that data must be forwarded has no available buffers in which to store the data.

FIG. 2 illustrates the occurrence of deadlock in a group of four switches, referred to as nodes, within a communication network. The nodes 30, 34, 38 and 42 of FIG. 1 each include buffers for storing data, and may be interconnected using any conventional type of communication links or media. The data flows 32, 36, 40 and 44 consist of data units passed over such communication links between the nodes 30, 34, 38 and 42.

In the scenario illustrated in FIG. 2, node 30's buffers are filled with packets received from a data flow 32. However, node 30 cannot forward the packets it has received to node 34, since node 34's buffers are filled with packets from a data flow 36 that node 34 can't forward to node 38, since node 38's buffers are filled with packets from data flow 40. Similarly, node 38 cannot forward its data to node 42, since node 42's buffers are also filled. FIG. 2 thus illustrates how the occurrence of deadlock in a network can result in significant network performance problems.

Existing routing systems have been developed which provide deadlock-free sets of paths by either constraining the topology of the network itself, and/or by constraining the routes which may be taken through the network. For example, the topology of a network may be constrained such that the network topology is arranged as a grid. Given a grid topology, if all paths through the network are required to first traverse links horizontally as far as necessary, then vertically to the destination node, the network will be deadlock-free.

Also, if the network topology is a tree, which by definition includes no loops, then the network will be deadlock-free during operation.

Existing systems have employed centralized techniques to compute deadlock-free sets of paths. A centralized approach operates such that one node obtains the complete topology of the network, for example by having each other node in the network report which neighbor nodes it is connected to. The central node then calculates a set of deadlock-free paths for the entire network, and stores them within a routing table. Once computed, these paths can then be distributed in forwarding tables to all other nodes, thus informing each node in the network which neighbor node to forward a received data unit to, for each potential destination within the network.

One existing approach to determining paths through a network is known as "up/down routing." In up/down routing, one of the nodes in the network is chosen arbitrarily as the root of a spanning tree for the network. All links within the network are then designated as "up" or "down" links with respect to the root node. The determination of an "up" or "down" state for a given link is based on the position of the link with respect to the spanning tree. A link is "up" if it points from a lower to a higher level node in the tree. Otherwise, the link is considered a "down" link. For nodes at the same level, node IDs are used to break the tie. Routing of packets from a source to a destination is performed such that any "up" links (towards the root) in the path are traversed before any "down" links are traversed (away from the root) in order to reach the destination. Accordingly, once a "down" link has been traversed, no "up" links may be used within that path. This approach produces routes that are deadlock-free. However, a significant problem with up/down routing is that a disproportionate amount of traffic may be directed through links connected to the root node.

For these reasons it would be desirable to have an efficient system for inserting routing information for a new node and/or link into a routing table, where the routing table reflects a set of deadlock-free routes for the network. The system should minimize the impact of adding a new node or link to the network in terms of modifications to the routing table, and the distribution of forwarding tables to nodes within the network. The system should further operate to maintain the deadlock-free quality of routes defined by forwarding information stored in the routing table.

BRIEF SUMMARY OF THE INVENTION

Consistent with principles of the present invention, a system and method for adding routing information for a new node to a routing table are disclosed. While reference is made herein to adding of routing information for a "new" node, the routing information added by the disclosed system may be for any node for which routing information is not currently stored in the routing table, whether or not any routing information for that node was ever previously stored within the routing table. The disclosed system operates to efficiently make changes to a routing table to support routing to and from the new node, and maintains the deadlock-free quality of paths described by the routing table. The routing table is generated by storing routing information in the routing table that reflects and describes a deadlock-free set of paths through a network of nodes. In order to insert the routing information related to the new node into the routing table, a new row and a new column of entries are added to the routing table. The new row stores forwarding information describing how to forward data units received by the new node. Each entry in the new row includes forwarding information to be applied to data units received by the new node, and addressed to an associated destination node corresponding to that entry. The forwarding information within each entry of the new row maintains the deadlock-free quality of the set of paths represented by the forwarding table.

The disclosed system also adds a new column of entries to the routing table. The new column includes a number of entries, each of which stores forwarding information describing how to forward a data unit addressed to the new node. Each entry in the new column includes forwarding information to be applied to data units received by an associated node within the network, and that are to be delivered to the new node. The forwarding information within each entry of the column maintains the deadlock-free quality of the set of paths represented by the forwarding table.

Various approaches may be used within the disclosed system to generate a deadlock-free set of paths represented by the routing table. In an illustrative embodiment, the disclosed system operates to determine a deadlock-free set of paths by forming an ordered set of deadlock-free sub-topologies of the network, where each sub-topology uses links that are not used in any other sub-topology. The illustrative embodiment then operates to generate the routing table based on the ordered set of deadlock-free sub-topologies.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

The disclosed system provides a method for adding routing information for a new node to a routing table. The new node may have one or more links connecting it to one or more other nodes within the pre-existing network. The network to which the disclosed system is applied may include any number of nodes, and may include various internetworking devices, such as those devices conventionally referred to as switches or routers. The links of the network may consist of any type of communications link suitable for interconnecting the nodes of the network, including copper, fiber optic, and/or wireless links. In an illustrative embodiment, the disclosed system may treat any bi-directional communication link within the network as two unidirectional links, so that the network can be analyzed as a number of unidirectional links interconnecting a number of nodes.

The node or nodes within the pre-existing network having direct links to or from the new node are referred to herein as "neighbor nodes" of the new node. It will also be recognized that the disclosed process may be used iteratively, starting with a small pre-existing network topology, even as small as two nodes, in order to generate the contents of a routing table. However, this may or may not result in optimal routes, depending on the specific network topology.

Figure 1:
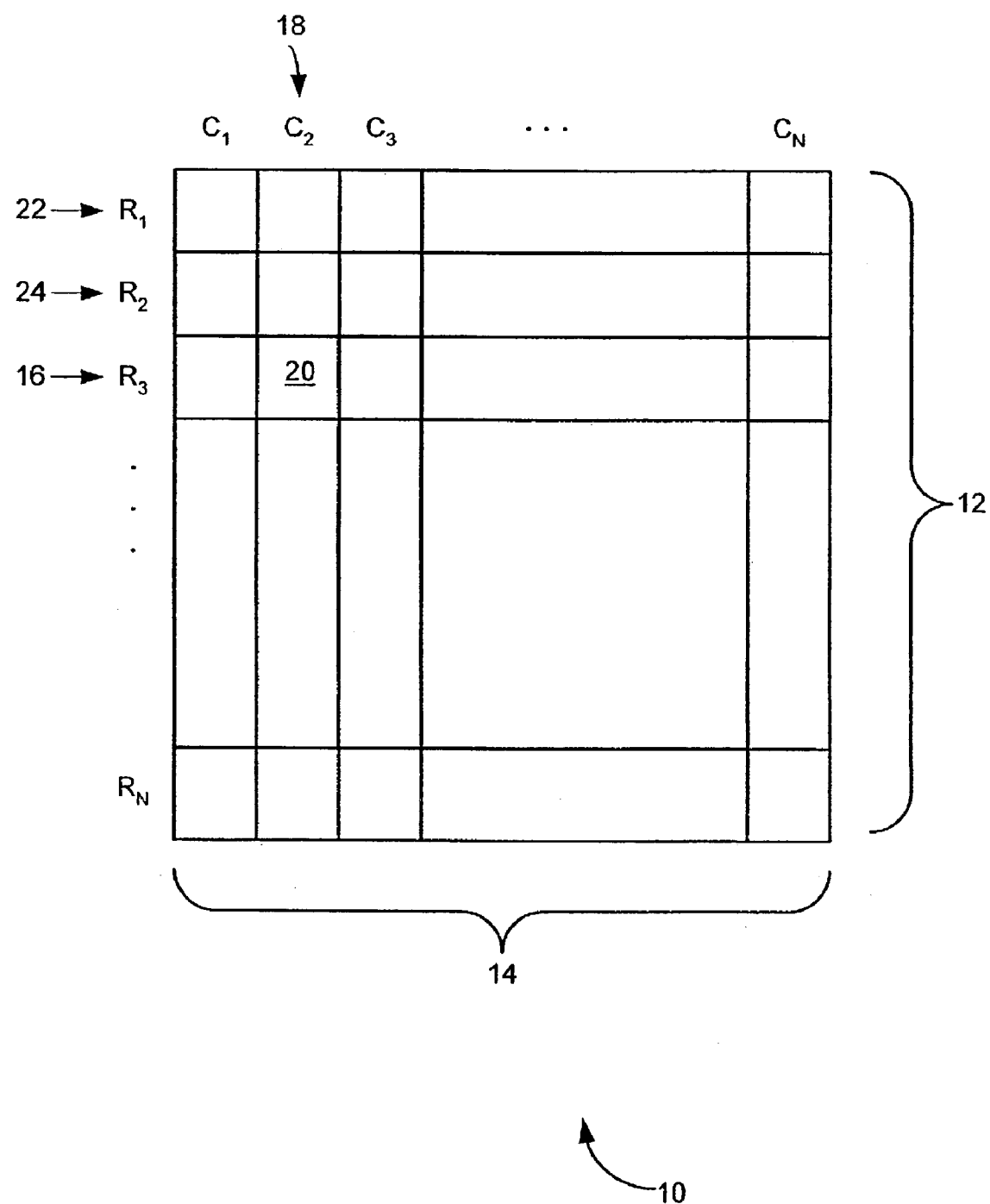
FIG. 1 shows a routing table.
Figure 2:
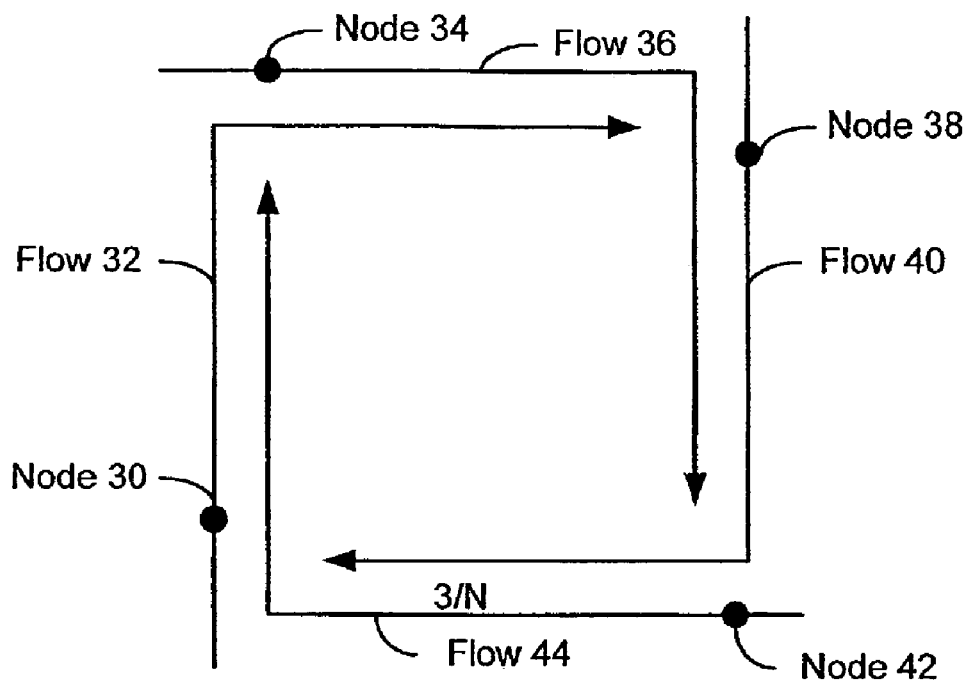
FIG. 2 illustrates a deadlock condition.
Figure 3:
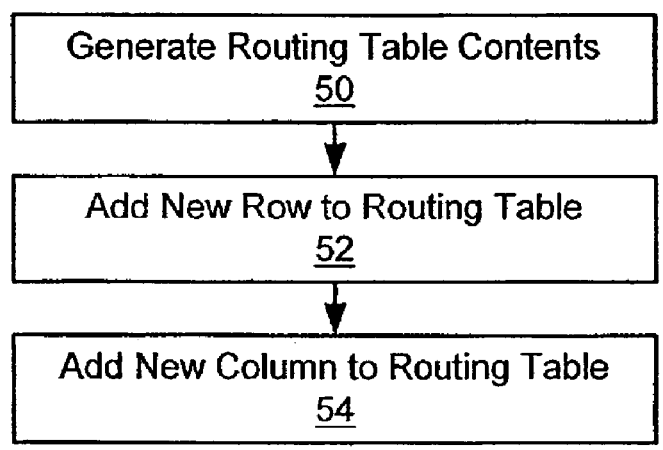
FIG. 3 is a flow chart showing steps performed in an illustrative embodiment to add routing information to a routing table.

The flow chart of FIG. 3 shows steps performed in an illustrative embodiment to add routing information to a routing table in response to addition of a node to an existing network. The steps shown in FIG. 3 may be performed in hardware or software, or some combination thereof. At step 50 of FIG. 3, the disclosed system operates to generate the contents of a routing table. The routing table generated at step 50 of FIG. 3 may, for example, have a format similar to that of the routing table shown in FIG. 1. In the illustrative embodiment of FIG. 3, the generation of the routing table contents includes generating a deadlock-free set of paths through a network of nodes. The generation of the deadlock-free set of paths may be accomplished using any of a number of specific techniques. In one embodiment, the techniques described herein below in connection with FIGS. 6–12, in which an ordered layer of deadlock-free sub-topologies are employed, is used to generate the deadlock-free set of paths that is loaded into the routing table at step 50 of FIG. 3.

At step 52, the disclosed system operates to add a new row of entries to the routing table. The new row includes a number of routing table entries. Each of the routing table entries in the new row includes forwarding information describing how a data unit addressed to a corresponding destination node, and received by the new node, should be forwarded. The forwarding information in each of the routing table entries within the row added at step 52 maintains the deadlock-free quality of the set of paths through the network of nodes.

Each entry within the row is associated with a destination node, and the forwarding information within that entry is used to describe the link to be used to forward data units from the new node to that destination node. In determining the forwarding information contained in the routing table entries of the row added at step 52, the presently disclosed system performs several actions with respect to each entry in the row. Specifically, for a given routing table entry within the row to be added, the disclosed system determines a set of cost values. The cost values determined may be derived from cost information reflecting any kind of cost, as determined, for example, by network management policy, resource allocation, and/or network performance considerations.

The set of cost values determined for a given entry, within the row includes cost values for reaching the associated destination node through each of the new node's neighbor nodes. Below is shown the equation for one of the cost values considered, for a row entry corresponding to a node referred to as Node_X, where the new node has a neighbor node referred to as Neighbor_A:

$$\text{New\_to\_}X\text{\_via\_}A(\text{Neighbor\_}A, \text{Node\_}X) = A\text{\_to\_}X + \text{New\_to\_}A$$

where

A_to_X=the cost of reaching the node corresponding to the entry, specifically node X, from a neighbor node A of the new node, and New_to_A=the cost of reaching the neighbor node A of the new node from the new node.

Similar cost values are generated for each neighbor node of the new node, with respect to the destination node (Node_X) associated with the routing table entry. Note that the path considered for determination of the A_to_X value is one of the existing paths defined by forwarding information stored within the pre-existing routing table. For any of the above costs, if the value is infinite, then the destination node is not reachable. For example, if node X is not reachable from node A, then the value of A_to_X would be infinite, as would the value of New_to_X_via_A.

The disclosed system then determines a minimum value from the set of cost values. The minimum value from a set of cost values is used to determine the forwarding information to be loaded into the entry associated with the set. Specifically, forwarding information indicating a link to one of the new node's neighbor nodes is stored within the entry. The path from that neighbor node of the new node to the associated destination node is a path in the deadlock-free set of paths described by the existing routing table prior to the addition of the new node. Accordingly, addition of the single link to the neighbor node from the new node will not destroy the deadlock free quality of the paths stored within the routing table.

Following step 52, at step 54, the disclosed system adds a new column to the routing table. The column added at step 54 includes a number of routing table entries. Each of the routing table entries within the column added at step 54 includes forwarding information describing how to forward a data unit addressed to the new node as a destination node, and received by a corresponding node within the network of nodes. The forwarding information within each of the routing table entries of the column added at step 54 maintains the deadlock-free quality of the set of paths through the network of nodes described by the routing table.

In determining the forwarding information contained in the routing table entries of the column added at step 54, the illustrative embodiment performs several actions with respect to each entry in the column. Specifically, for a given routing table entry within the column to be added, the disclosed system first determines a set of cost values. Each entry within the column corresponds to a node within the existing network. The forwarding information within each entry describes a link for forwarding data units having a destination address indicating the new node. The set of cost values determined for a given entry within the column added at step 54 includes cost values for reaching the new node using any existing paths from the associated node through any of the new node's neighbor nodes. Below is shown the equation for one of the set of cost values considered, for a column entry associated with a source node referred to as Node_X, where the new node has a neighbor node referred to as Neighbor_A:

$$X\_to\_New\_via\_A(\text{Neighbor\_}A, \text{Node\_}X) = X\_to\_A + A\_to\_New$$

where

X_to_A=the cost of reaching a neighbor node A of the new node from a source node X associated with the entry, and A_to_New=the cost of reaching the new node from neighbor node A of the new node.

Similar cost values are generated for each neighbor node of the new node, with respect to the source node (Node_X) corresponding to the entry. The path considered for determination of the X_to_A value is one of the existing paths defined by forwarding information stored within the existing routing table. For any of the above costs, if the value is infinite, then the destination node is not reachable. For example, if node A is not reachable from node X, then the value of X_to_A would be infinite, as would the value of X_to_New_via_A.

The disclosed system then determines a minimum of the set of cost values. The minimum value from the set of cost values determines the forwarding information to be loaded into the entry. Specifically, forwarding information indicating the initial link within the lowest cost path from the associated source node to the new node is stored within the entry. Since the path from the source node is one of the existing paths from the deadlock-free set of paths described by the routing table prior to addition of the new node, addition of the single link from the neighbor node to the new node will not destroy the deadlock free property of the paths stored within the routing table.

Further in the illustrative embodiment of FIG. 3, the routing table entries within the row added in step 52 and the column added in step 54 may also include cost information. For example, cost information for a given routing table entry describes a cost associated with the link over which data units are forwarded based on the forwarding information also contained within that forwarding table entry. Such cost information may reflect any kind of cost, calculated based on network management policy, resource allocation, and/or network performance considerations. Cost information may express an amount of available bandwidth, and/or delay associated with a given link.

Figure 4:
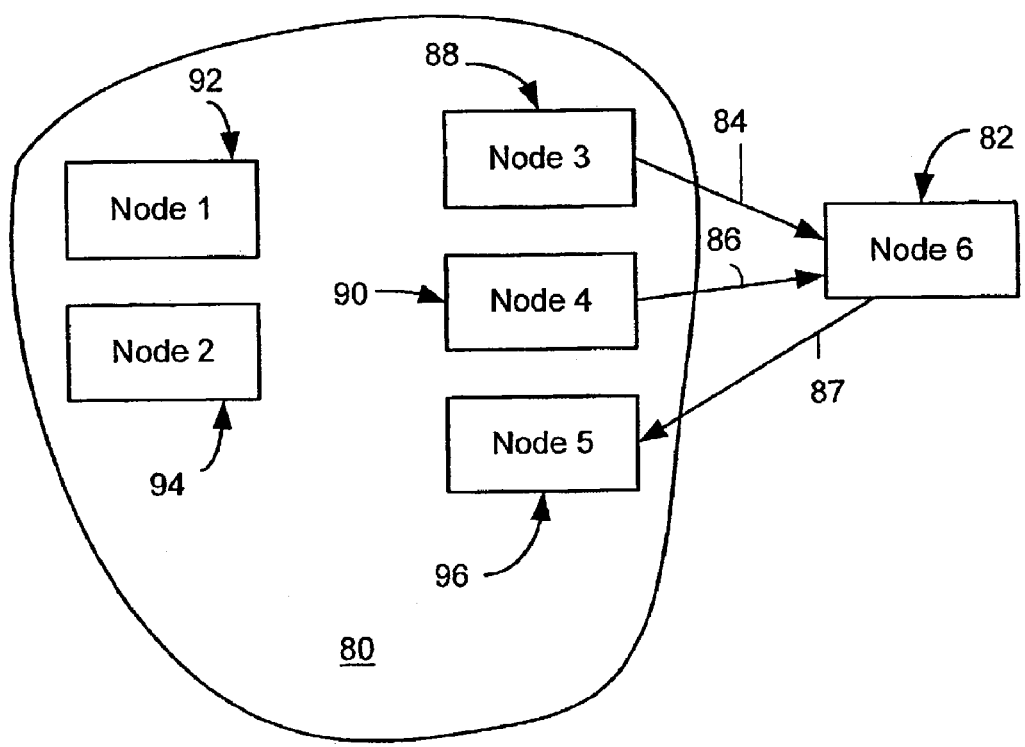
FIG. 4 illustrates addition of a node to an existing network.

FIG. 4 shows a new node 6 82 being added to an existing network 80. The existing network 80 includes N nodes, where N=5, shown as node 1 92, node 2 94, node 3 88, node 4 90, and node 5 96. The new node 6 82 may thus be considered node N+1 with respect to the existing network 80. The new node 6 82 is shown connected to node 3 88 and node 4 90 by links 84 and 86 respectively, and to node 5 96 by link 87. The links 84 and 86 are shown, for purposes of illustration, as unidirectional links leading from nodes 3 88 and 4 90 respectively to node 6 82. Thus links 84 and 86 may be considered "incoming" links with respect to the new node 6 82. Link 87 is considered an "outgoing" link with respect to node 6 82. Node 3 88, node 4 90, and node 5 96 are neighbor nodes with respect to the new node 6 82.

Figure 5:
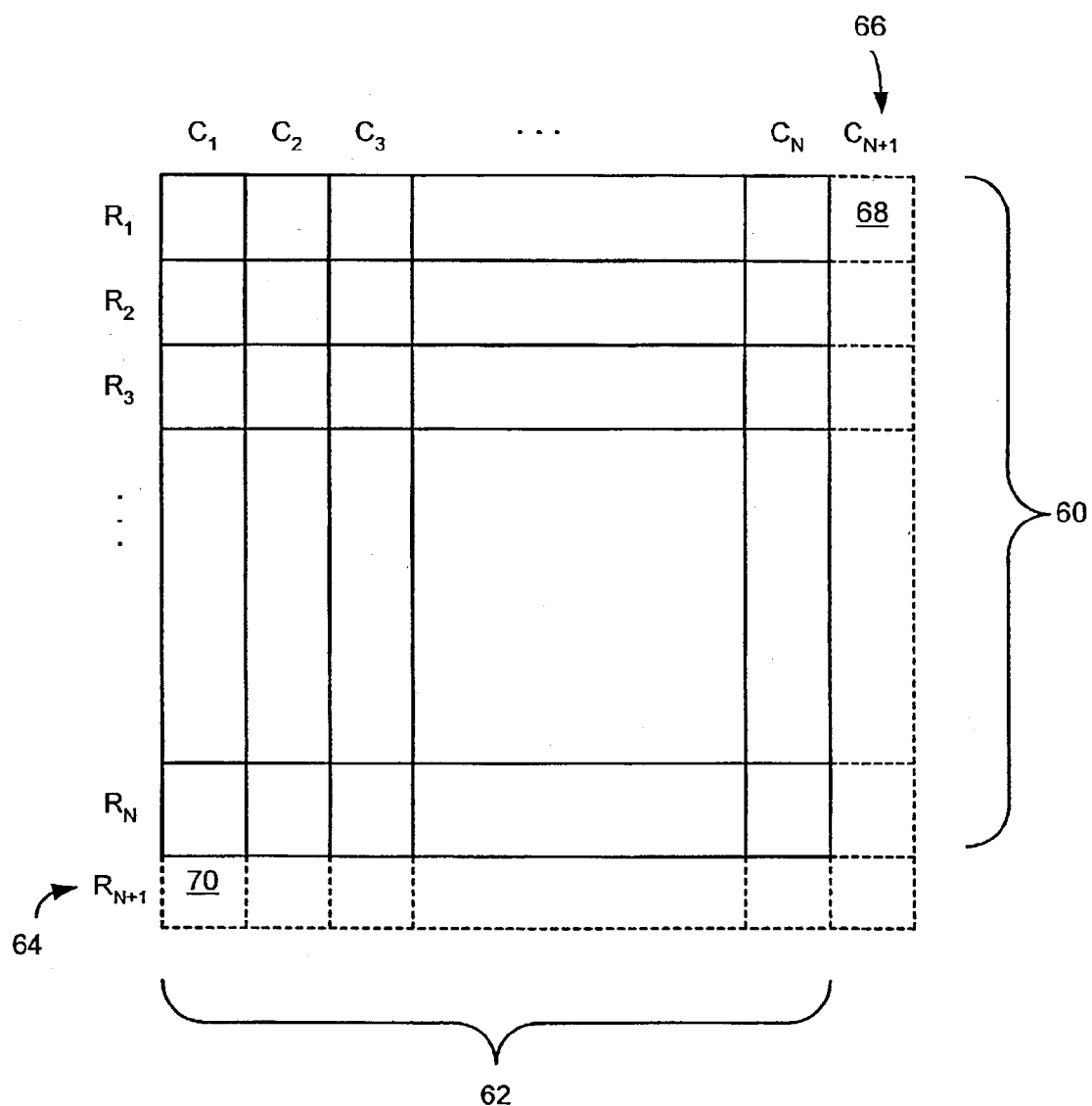
FIG. 5 illustrates addition of a new row and a new column to an existing routing table consistent with the disclosed system.

During operation of the disclosed system, routing information regarding the new node 6 82 shown in FIG. 4 is added to a routing table as illustrated in FIG. 5. As shown in FIG. 5, an existing routing table for an existing network having N nodes initially includes rows $R_1$ through $R_N$ 60 and columns $C_1$ through $C_N$. In response to addition of a new node N+1 to the network, such as node 6 82 of FIG. 4, the disclosed system adds a new row $R_{N+1}$ 64 and a new column $C_{N+1}$ 66 to the routing table.

The forwarding information stored in the entries within new row $R_{N+1}$ 64 describes how data units are to be forwarded from the new node N+1 towards the various destination nodes within the network. Accordingly, the forwarding information in the entries within the new row $R_{N+1}$ 64 indicates which outgoing link of the new node N+1 is to be selected for forwarding data units from new node N+1 toward specific destination nodes indicated by the column indices of the columns 62. In the example shown in FIG. 4, since there is only one outgoing link from the new node 6 82, each of the entries within the new row $R_{N+1}$ 64, including the routing table entry 70, would indicate the same outgoing link, shown as link 87 in FIG. 4. In the case where multiple outgoing links are available to the new node, the disclosed system determines forwarding information for each of the entries in the new row $R_{N+1}$ 64 to reflect lowest cost paths to each of the nodes in the existing network, by choosing the lowest cost existing path from the new node to the associated destination node through one of the neighbor nodes, and also considering the cost of the links from the new node to the neighbor nodes.

The forwarding information stored in the entries within new column $C_{N+1}$ 66 describes how data units addressed to the new node N+1 are to be forwarded from the nodes in the existing network. Accordingly, the forwarding information in the entries within the new column $C_{N+1}$ 66 must indicate which outgoing link of each node in the existing network is to be used to forward data units towards the new node N+1. In the example shown in FIG. 4, each of the entries in the new column $C_{N+1}$ 66 would indicate a next hop link within an existing path to one of the neighbor nodes 3 88 or 4 90 having links capable of delivering data units to the new node N+1.

While the disclosed system may be embodied using various techniques to generate a deadlock-free set of paths, the following figures describe an illustrative embodiment in which an ordered set of deadlock-free sub-topologies of the network are used to find a deadlock-free set of paths through the network. The deadlock-free sub-topologies generated by the illustrative embodiment system are referred to herein as "layers". One or more of the deadlock-free sub-topologies of the network may or may not consist of a spanning layer of the network. Such a spanning layer includes every node in the network.

Figure 6:
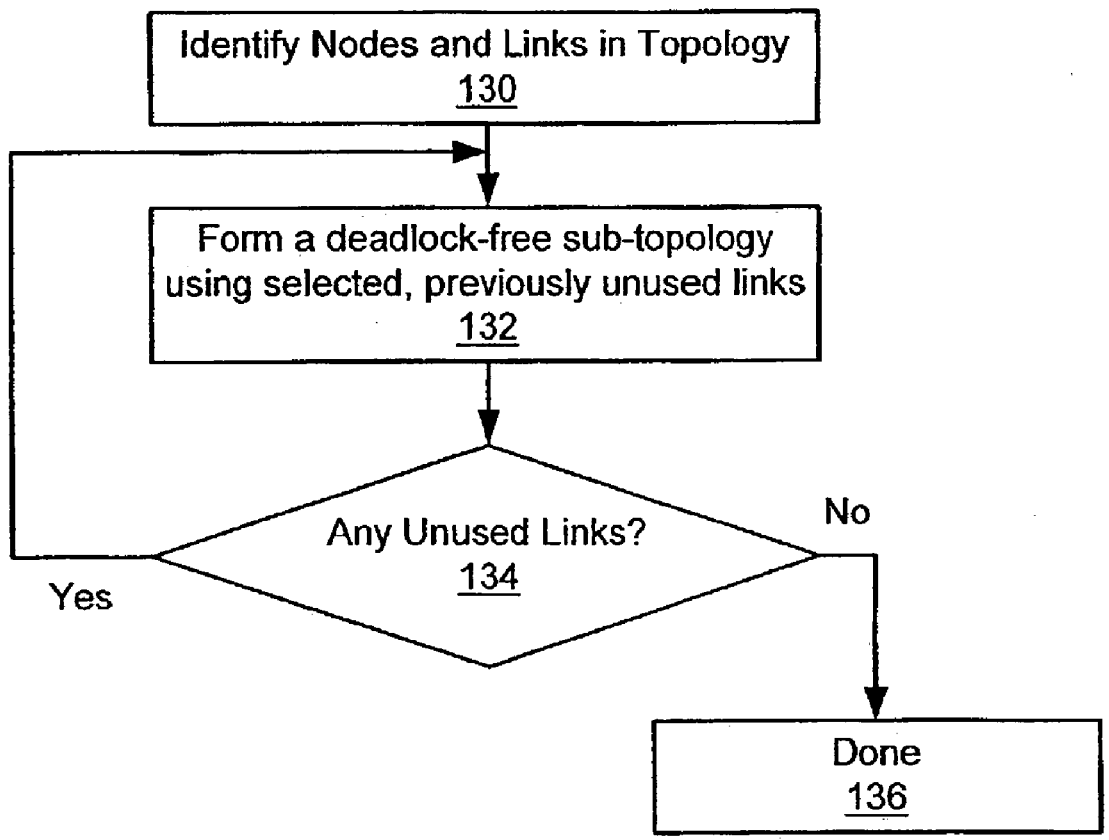
FIG. 6 is a flow chart showing steps performed in an illustrative embodiment to generate an ordered set of deadlock-free layers.

As shown in FIG. 6, at step 130, the disclosed system first identifies those nodes and links that form the network to be processed. The nodes of the network may, for example, consist of various internetworking devices, such as those devices conventionally referred to as switches. The links of the network may consist of any type of communications link suitable for interconnecting the nodes of the network.

At step 132 of FIG. 6, the disclosed system forms a layer consisting of a deadlock-free sub-topology of the network being processed. The layer formed at step 132 may be any kind of deadlock-free sub-topology of the network. The links used to form a layer during step 132 are considered to be "used", and therefore unavailable for use in any other layer. Accordingly, each layer formed at step 132 consists of "unused" links with respect to any other layer.

Subsequent to step 132, at step 134, the disclosed system determines whether there are any links in the network that remain unused. If not, then step 134 is followed by step 136, since the system has completed formation of all layers. If so, then step 132 is repeated until each link in the network has been used within one layer. In the case where the network contains multiple links between nodes, the disclosed system may repeat steps 132 and 134 either until each link in the topology has been used within a layer, or until a predetermined number of layers have been formed. Similarly, where the network includes virtual channels over which paths may be established, then the disclosed system may repeat steps 132 and 134 either until all virtual channels have been used within the ordered set of layers, or until a predetermined number of layers have been formed.

The layers formed during step 132 may be spanning trees, or any other type of deadlock-free sub-topology of the network. Other specific types of deadlock-free sub-topologies may be employed, such as a sub-topology consisting of a number of paths determined using an up/down routing approach. The process of successively forming deadlock-free layers using unused links continues until either all possible deadlock-free layers have been formed, or until a predetermined number of deadlock-free layers have been formed. In one embodiment, when insufficient unused links remain to connect all nodes of the network, more layers may be formed consisting of deadlock-free sub-topologies that include as many of the remaining links as possible without forming any loops. Such non-spanning tree sub-topologies may be thought of as disconnected groups of trees, and are referred to herein as "forests".

The disclosed system may form a spanning tree as one or more of the layers in the ordered set of layers. Such a spanning tree may be formed using a conventional approach applied to those links available for use in any given layer. For example, Kruskal's algorithm may be applied to the remaining links at any layer in order to determine a spanning tree. As it is generally known, Kruskal's algorithm operates by maintaining a set of partial minimum spanning trees, and repeatedly adding the least costly, i.e. shortest, link in the network which connects nodes that are in different partial minimum spanning trees. A pseudo-random number generator may be used to break ties in the case of equal cost links. Other methods of obtaining spanning trees may be used in addition or in the alternative. For example, methods based on Prim's algorithm, which builds upon a single partial minimum spanning tree, at each step adding an edge connecting the vertex nearest to but not already in the current partial minimum spanning tree, may be used.

Following the steps shown in FIG. 6, the disclosed system determines an ordering for the layers that have been formed. The specific ordering of the layers may be determined in any way. For example, the ordering used may be based on the order in which the layers were formed, during the steps shown in FIG. 6. However, this is only one example of how an ordering may be provided to the set of deadlock-free layers, and any other arbitrary system of ordering may be provided in the alternative.

Figure 7:
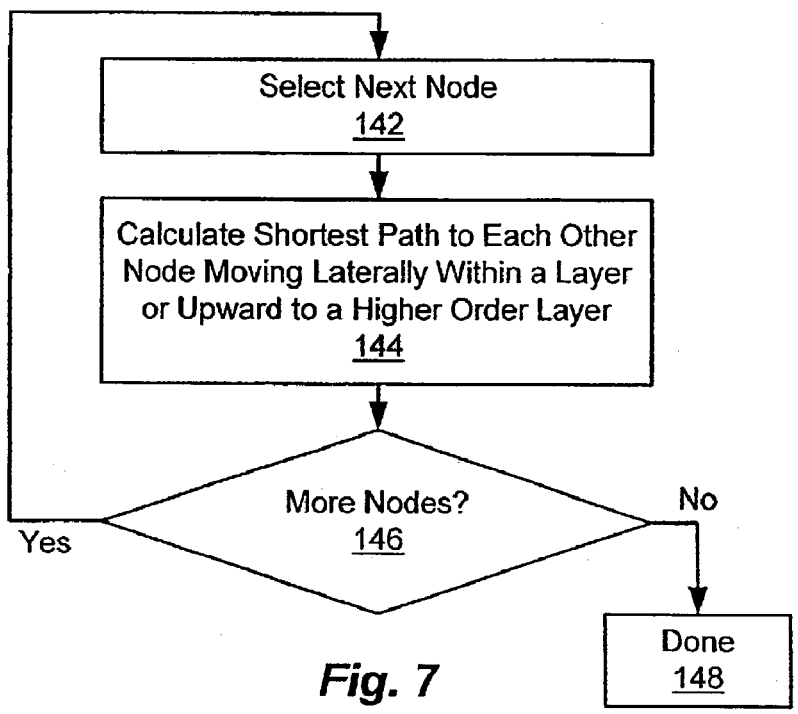
FIG. 7 is a flow chart showing steps performed in an illustrative embodiment to generate minimum cost paths through a network using an ordered set of deadlock-free layers.

The resulting ordered set of layers is then made available to a shortest-path route calculation process, as illustrated in FIG. 7. At step 142 of FIG. 7, a node is selected for processing that has not been previously processed by the steps shown in FIG. 7. At step 144, using the node selected at step 142, the disclosed system calculates a least costly (i.e. shortest) path to each other node in the network, considering both the cost of each link in each path, and the layer that each link is associated with in the ordered set of layers. In particular, during step 144, the disclosed system operates such that at any node being utilized to assess a minimum path, the path may move to any higher-ordered layer, but may never return to a lower ordered layer. In this way, within each layer of calculation, a path moves through a tree and thus avoids deadlock. Additionally, a path may only move in a single direction between layers, thus also avoiding deadlock. For any given node, traversal of the ordered set of layers in this fashion may begin at any layer, and then proceed in order through the ordered set of layers.

Accordingly, as described above, the shortest path determination performed by the disclosed system using the ordered set of layers may be provided in connection with what is generally referred to as an all-pairs path calculation. As it is generally known, an all-pairs determination operates to find the length of the shortest paths between all pairs of nodes in a network in which each link is associated with a cost. Moreover, the disclosed system may be implemented as a modification to a system which employs Dykstra's algorithm, which operates to find the shortest paths from a single source node to all other nodes in a network.

An embodiment of the disclosed system to calculate the all-pairs shortest paths is now explained in the context of a bottom-up all-pairs path calculation. For each layer L in the ordered set of layers, an adjacency matrix, w(L,i,j) is employed. An entry in the adjacency matrix w has a value of 1 where a link exists between two nodes, i and j, at a layer L, and has a value zero where there is no such link. Further in the illustrative embodiment, the disclosed system determines for each layer L a distance array d(L,i,j). An entry in the distance array d contains the distance between nodes i and j, where only layers less than or equal to L have been utilized to traverse a path between nodes i and j. Each entry d(L,i,j) is initialized with an infinite value if i is not equal to j, and starts out with a value of 0 when i is equal to j. A temporary matrix dp(L,i,j) is initialized at the beginning of each iteration to infinity, and after each iteration is copied into d. The illustrative embodiment then operates to loop through the nodes in the network as indicated by the pseudo-code below:

```
for( int i = 0; i < N; i++) {// N is the number of nodes
    for( int j = 0; j < N ; j++) {
        for( int L1 = 0; L1 < Layers-1; L1++) {
            // only check the next layer up
            // can also check every layer above for better
            // paths - at more cost
            for ( int k = 0; k < N; k++
                int test = d(L1,i,k) + w(L1,k,j);
                if( test < dp(L1,i,j) ) {
                    dp(L1,i,j) = test;
                    dp(L1,j,i) = test;
                }
                test = d(L1,i,k) + w(L1+1,k,j);
                if( test < dp(L1+1,i,j) ) {
                    dp(L1+1,i,j) = test;
                    dp(L1+1,j,i) = test;
                }
            }
        }
    }
}
```

Operation then continues by updating the contents of d with the contents of dp, and performing the above iteration again.

After a first iteration, the distance array d contains all available paths of length 2 between any two given nodes using all available layers up to the layer specified in the first index of the array. Repeating the above loop with the original matrix w will update d to all available paths of length 3 between two nodes using all available layers up to the layer specified in the first index of the array. This process is continued until all paths have been reached, wherein the minimal value of d for any layer represents the minimal deadlock-free length that can be found between these two nodes. A helper matrix is maintained to store the running history of transitions which represents a minimal path obtained between the two nodes. In an alternative embodiment, the disclosed system may check every layer above the current level for possible transitions. However, this checking increases the complexity of the system significantly. Moreover, in an embodiment in which the disclosed system checks the layer immediately above for an available transition, a solution may be obtained that is near optimal.

In another embodiment of the disclosed system, at the end of each of the above iterations, the array w may be replaced with the distance array d. In this manner, the shortest paths of length less than or equal to 1 are connected together to form the shortest paths of length less than or equal to 2, then the shortest paths of length less than or equal to 2 are connected together to find the shortest paths of length less than or equal to 4, and so on, thus allowing the performance complexity of the system to be reduced.

Other embodiments of the disclosed system may be obtained through application of a parallel Dykstra's shortest-path algorithm, wherein the priority-queue utilized in each shortest-path calculation is based upon a Fibonacci heap, and the neighbor nodes utilized for relaxation at each node are layered according to the accessible nodes of the corresponding tree or forest.

Whether or not the pseudo-code shown above succeeds in finding a path between every pair of nodes in the network depends on how the layers were chosen. In one embodiment of the disclosed system, at least one layer (for example, the first layer to be formed) is chosen so as to be a spanning subgraph (that is, a subgraph that is connected and contains every node of the network). This condition is sufficient to guarantee that the pseudo-code will identify a path for every pair of nodes in the network. Those skilled in the art will appreciate that other embodiments may choose layers in such a way that no layer is a spanning subgraph and yet so as to assure that a path will be found for every pair of nodes.

In an alternative embodiment, if a given layer is not loop-free, but nevertheless represents a deadlock-free set of paths, a deadlock-free set of paths using all layers may be determined as follows. First, assume there is a deadlock-free set of paths using n layers. Next, that deadlock-free set of paths may be extended across one more layer, where the new layer itself also has a deadlock-free set of paths, by the following process:

For each pair of nodes (A,B):
  For each node C (where C is not A and C is not B):
    check if the path from A to C (within the n layers) plus the path from C to B (within the new layer) is better than the path from A to B within the n layers, or any path found through any other node C' in this step. If so, replace the path from A to B by the path that goes from A to C (within the first n layers), concatenated with the path from C to B (within the new layer).

Figure 8:
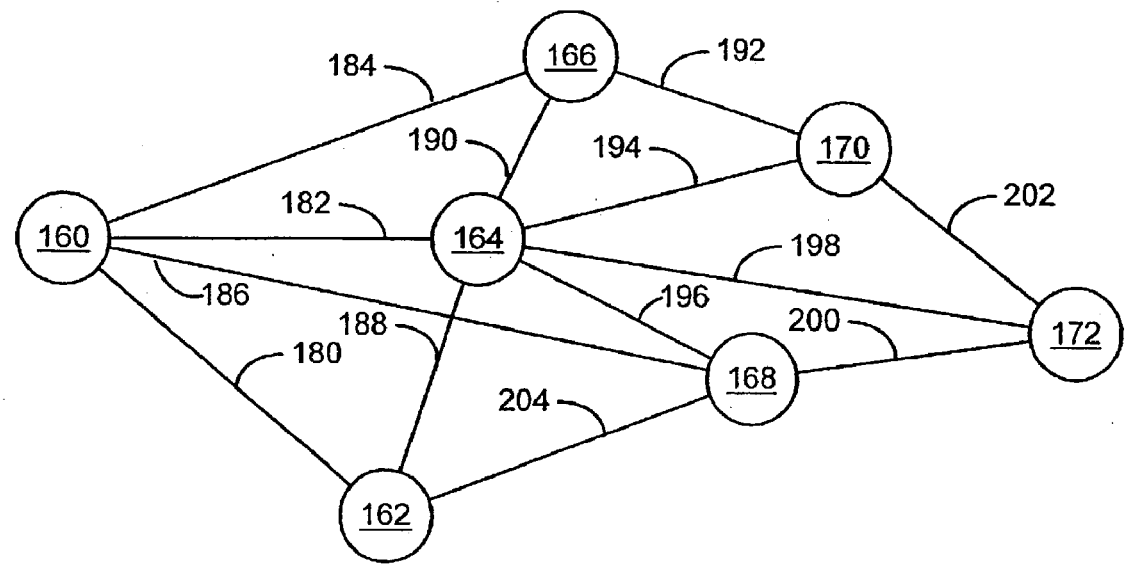
FIG. 8 shows a network including a number of nodes and links between nodes.

FIG. 8 shows an illustrative network for purposes of discussion that includes a number of nodes and links between nodes. The nodes shown in FIG. 8 may comprise any kind of networking devices, such as routers or switches. The links of FIG. 8 may be any kind of communications link, such as fiber optic, coax, or twisted pair cable, or virtual channels. As shown in FIG. 8, a set of nodes 160, 162, 164, 166, 168, 170, 172 are interconnected by a set of links 180, 182, 184, 186, 188, 190, 192, 194, 196, 198, 200, 202, and 204.

Figure 9:
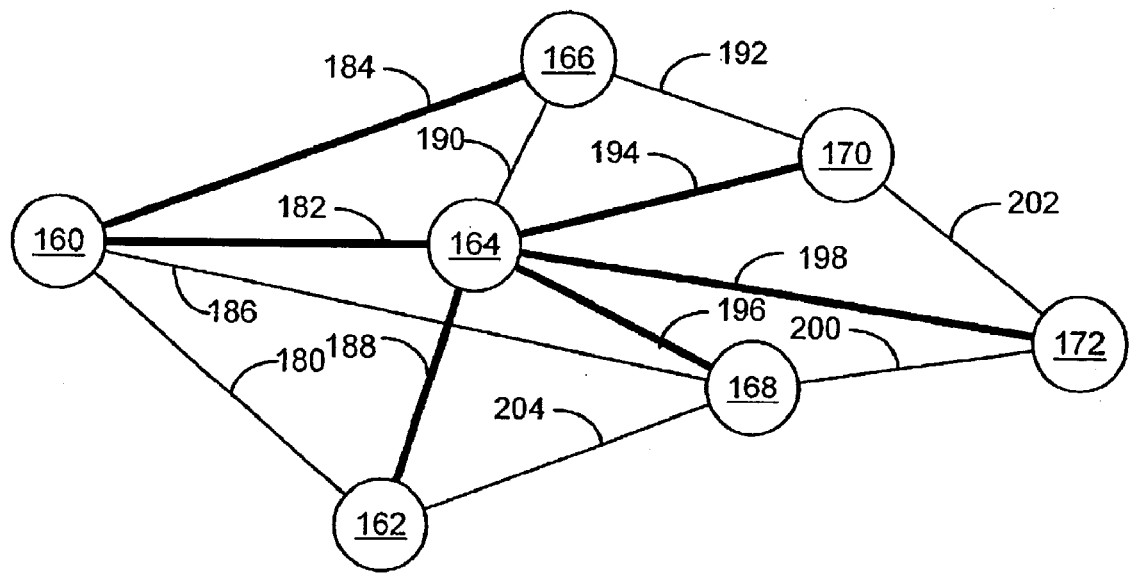
FIG. 9 shows an example of an initial deadlock-free sub-topology layer of the network shown in FIG. 8.
Figure 10:
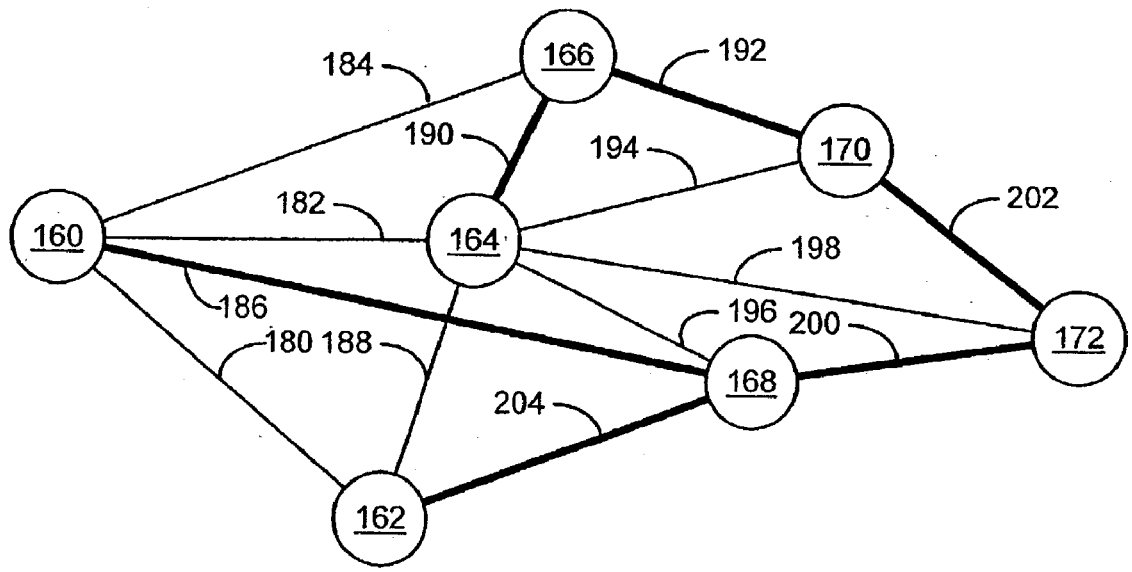
FIG. 10 shows an example of a second deadlock-free sub-topology layer of the network shown in FIG. 8.

FIG. 9 illustrates an initial layer formed by the disclosed system. The initial layer shown in FIG. 9 is a spanning tree for the network shown in FIG. 8, and includes the links 182, 184, 188, 194, 196 and 198. The layer shown in FIG. 9 is referred to as layer 1 with respect to the network shown in FIG. 8. FIG. 10 shows a second layer (layer 2), which is a spanning tree utilizing links from the network of FIG. 8 which were not used in the layer 1 as illustrated in FIG. 9. The layer 2 shown in FIG. 10 includes the links 186, 190, 192, 200, 202 and 204.

Figure 11:
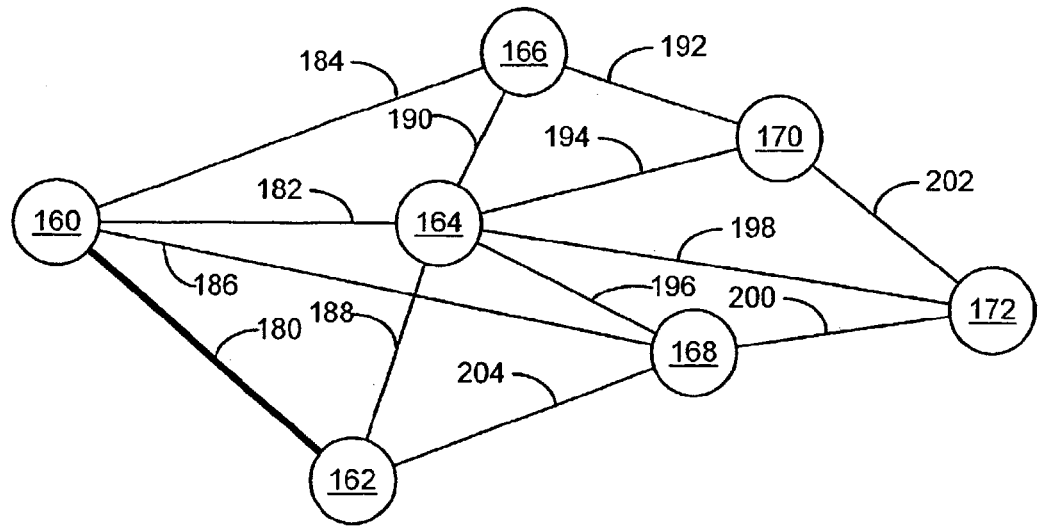
FIG. 11 shows an example of a third deadlock-free sub-topology layer of the network shown in FIG. 8.

FIG. 11 shows an example of a third deadlock-free layer with respect to the network shown in FIG. 8. As shown in FIG. 11, layer 3 includes the link 180, which is the only remaining link that is unused following the formation of the layers shown in FIGS. 9 and 10. Thus the layer shown in FIG. 11 is an example of a non-spanning tree layer, also referred to as a forest.

Figure 12:
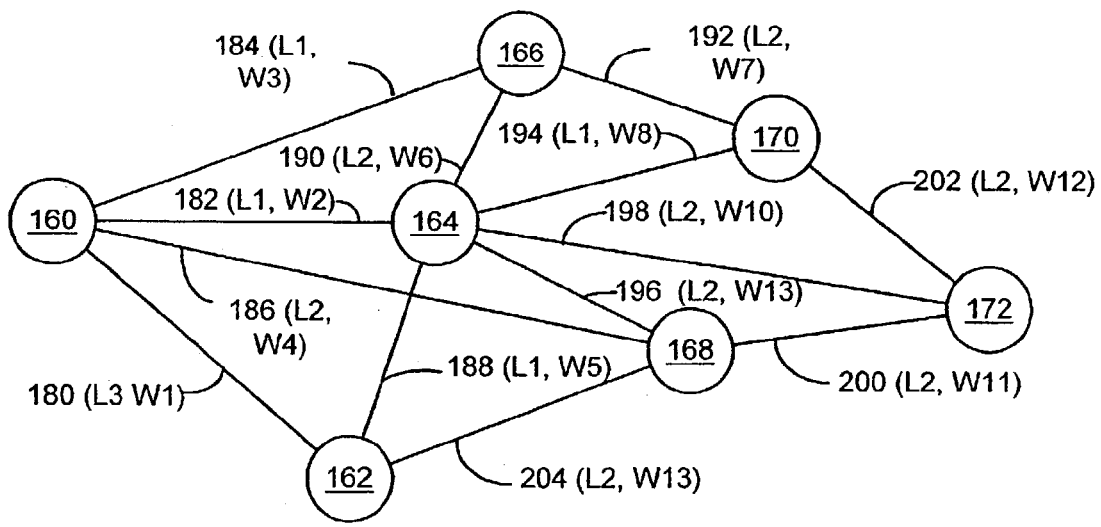
FIG. 12 shows the network of FIG. 8 with layer assignments associated with the links according to the layers shown in FIGS. 9–11.

FIG. 12 shows the network of FIG. 8 with layer assignments associated with the links according to the layers shown in FIGS. 9–11. As shown in FIG. 12, e.g., link 180 is associated with layer L3 and a weight W1 (L3, W1). The other links are similarly labeled.

In one embodiment of the disclosed system, the weights and layers shown associated with the links of the network in FIG. 12 may be used to determine the shortest paths between the nodes in the network. The weights associated with each link indicate a cost or distance associated with the link. Each path must only include links associated with a layer of an order at least as great as any preceding layer within the ordered set of layers generated by the disclosed system.

Figure 13:
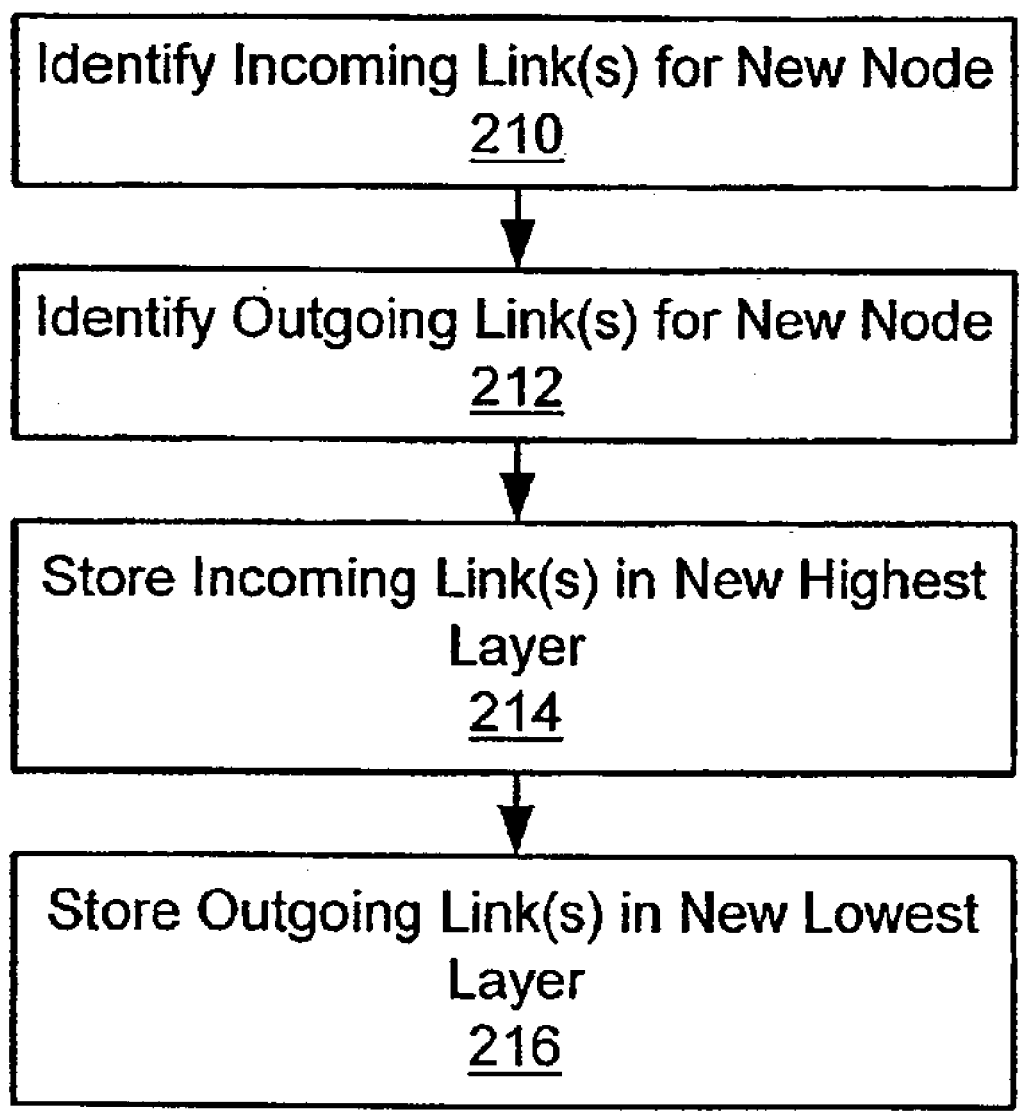
FIG. 13 is a flow chart showing steps in a method for inserting routing information regarding a new node into a routing table.

FIG. 13 is a flow chart illustrating the disclosed process for inserting routing information regarding a new node into an existing routing table, where the routing table stores forwarding information describing a deadlock-free set of paths, and where that forwarding information was derived from an ordered set of layers as described above. At step 210, the disclosed system identifies any incoming links with respect to the newly added node. At step 212 the disclosed system identifies any outgoing links with respect to the newly added node. Then, at step 214, the incoming link(s) are added to a new highest order layer of the ordered set of layers from which the existing deadlock-free set of paths through network were determined. Similarly, at step 216, a new lowest layer is formed including any outgoing links determined at step 212. The routing paths for the network may then conveniently be determined based on the modified ordered set of layers without introducing deadlock to the set of paths.

In an alternative embodiment, in the case where the existing set of ordered layers includes two or more layers, the incoming links of the new node may be added to the existing highest order layer, and the outgoing links of the new node may be added to the existing lowest order layer. However, in the case where the existing set of ordered layers includes only a single layer, then either a new highest order layer or a new lowest order layer must be generated. For example, a new highest order layer could be generated to include the incoming links of the new node, and the outgoing links of the new node would be added to the existing single layer. Similarly, a new lowest order could be generated to include the outgoing links of the new node, and the existing single layer could be modified to include the incoming links of the new node.

Figure 14:
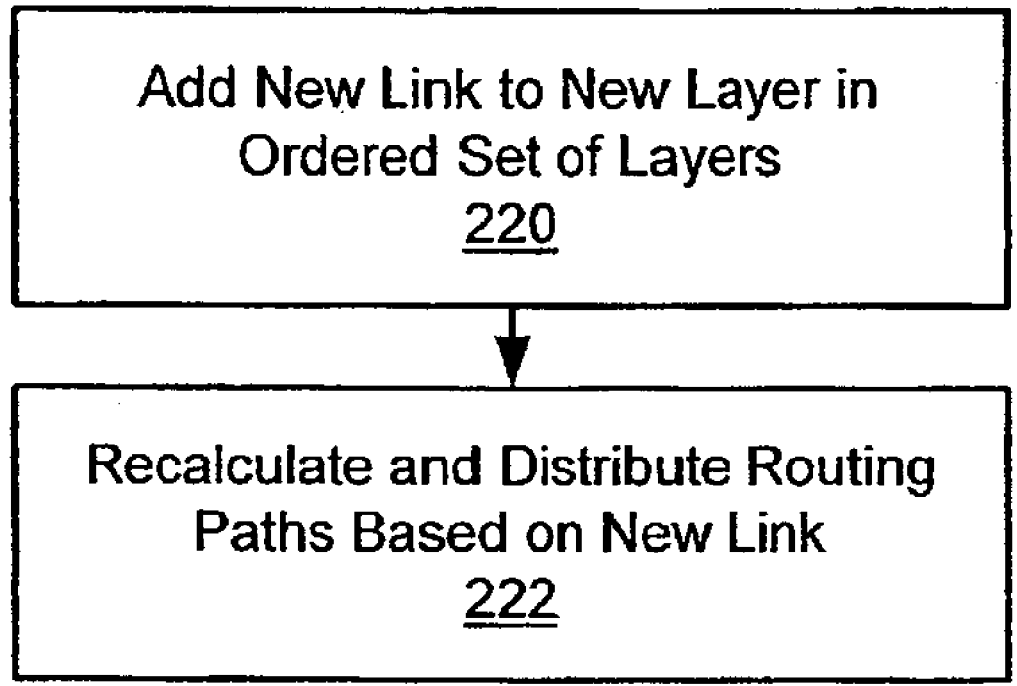
FIG. 14 is a flow chart illustrating steps performed in an illustrative embodiment to add routing information reflecting a new unidirectional link in a network to a routing table.

FIG. 14 is a flow chart illustrating steps performed in an illustrative embodiment to add routing information to an existing routing table reflecting the addition of a new unidirectional link to an existing network, and where the forwarding information within the routing table defines a deadlock-free set of paths determined based on an ordered set of layers as described herein. As shown in FIG. 14, at step 220, the disclosed system adds the new link to a new layer of the ordered set of layers. The new layer may then be added anywhere within the ordered set of layers.

At step 222, the routing paths are recalculated based on the newly added link. For example, let the new link be from a Node A to a Node B. If the new layer is added as a new highest layer within the ordered set of layers, then the column in the routing table that defines how to reach Node B can be optimized using any appropriate optimization method, in order to determine whether better routes can be generated using the new link to reach Node B. If the new layer is added as the lowest order layer, then the row in the routing table that defines how to reach other nodes from Node A can be optimized using any appropriate optimization, in order to determine whether better routes can be generated going through Node B. If the new layer is added as something other than the highest or lowest order layer in the ordered set of layers, then the new link may at least be used to go from Node A to Node B. Thus the recalculation performed at step 222 may be relatively quick, and the deadlock-free property of the existing path set is preserved, since the existing path set itself is preserved.

In the case of adding routing information to an existing routing table reflecting the addition of a new bi-directional link to an existing network, and where the forwarding information within the routing table defines a deadlock-free set of paths determined based on an ordered set of layers as described herein, the addition of the new bi-directional link may be treated as the addition of two unidirectional links. Accordingly, the steps described in connection with FIG. 14 may thus be performed once for each of the two unidirectional links. For example, a new bi-directional link connecting Node A and Node B would be processed as a first unidirectional link from Node A to Node B and a second unidirectional link from Node B to Node A.

Those skilled in the art should readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. In particular, while some of the illustrative embodiments are described in connection with the use of spanning trees, the disclosed system and method are also applicable to any other kind of sub-topology which contains no loops, and is accordingly deadlock-free. Accordingly, the invention should not be viewed as limited except by the scope and spirit of the appended claims.

What is claimed is:

1. A method for adding routing information for a new node to a routing table with a plurality of entries that reflect an existing deadlock-free set of paths through a network of nodes, wherein the routing table has a row for each source node in the network and a column for each destination node in the network and wherein a table entry located at an entry row and an entry column identifies a link that can be used to send data from the source node in the entry row to the destination node in the entry column, the method comprising:

forming an ordered set of deadlock-free sub-topologies of said network, each sub-topology comprising links that are not used in any other sub-topology;

generating said routing table as a function of said ordered set of deadlock-free sub-topologies;

adding to the routing table, a row including a plurality of entries, each entry identifying a link that directly connects the new node to a neighbor node that can be connected, via existing deadlock-free paths described by the table, to a destination node associated with the entry column; and adding to the routing table a column including a plurality of entries, each entry identifying a link that can be used to connect a source node associated with the entry row, via existing deadlock-free paths described by the table, to a neighbor node that can be directly connected to the new node, wherein the paths defined in the routing table continue to define deadlock-free paths in the network after addition of the row and column for the new node.

2. The method of claim 1, wherein said forming said ordered set of deadlock-free sub-topologies of said network further comprises forming at least one sub-topology of said network that is a spanning layer of said network.

3. The method of claim 2, further comprising maintaining a cost of a corresponding link between each of said nodes in said network within each entry of said routing table.

4. The method of claim 3, wherein said adding said column to said routing table further comprises:

for each entry within said column, performing the following steps determining a set of cost values, wherein each value within said set of cost values reflects a sum of the cost of reaching a selected neighbor node of said node from said corresponding forwarding node and the cost of reaching said node from said selected neighbor node, determining a minimum value of said set of cost values, and determining forwarding information for said entry indicating said selected neighbor node associated with said minimum value.

5. The method of claim 3, wherein said adding said row to said routing table further comprises:

for each entry within said row, performing the following steps determining a set of cost values, wherein each value within said set of cost values reflects a sum of the cost of reaching said corresponding destination node from a selected neighbor node of said node and the cost of reaching said selected neighbor node from said node, determining a minimum value of said set of cost values, and determining forwarding information for said entry indicating said selected neighbor node associated with said minimum value.

6. The method of claim 1, further comprising iteratively performing said steps of adding a row of entries and adding a column of entries in order to add routing information to said routing table for a plurality of nodes.

7. The system of claim 6, wherein said routing logic is further operable to form said ordered set of deadlock-free sub-topologies of said network further by forming at least one sub-topology of said network that is a spanning layer of said network.

8. The system of claim 7, wherein said routing logic is further operable to maintain a cost of a corresponding link between each of said nodes in said network within each entry of said routing table.

9. The system of claim 8, wherein routing logic operable to add said column to said routing table is further operable to perform the following steps for each entry within said column:

determine a set of cost values, wherein each value within said set of cost values reflects a sum of the cost of reaching a selected neighbor node of said node from said corresponding forwarding node and the cost of reaching said node from said selected neighbor node;

determine a minimum value of said set of cost values; and determine forwarding information for said entry indicating said selected neighbor node associated with said minimum value.

10. The system of claim 8, wherein said routing logic operable to add said row to said routing table is further operable to perform the following steps for each entry within said row:

determine a set of cost values, wherein each value within said set of cost values reflects a sum of the cost of reaching a corresponding node from a selected neighbor node of said node and the cost of reaching said selected neighbor node from said node;

determine a minimum value of said set of cost values; and determine forwarding information for said entry indicating said selected neighbor node associated with said minimum value.

11. The method of claim 1, wherein said existing deadlock-free set of paths are through a network of two nodes.

12. A system for adding routing information for a new node to a routing table with a plurality of entries that reflect an existing deadlock-free set of paths through a network of nodes, wherein the routing table has a row for each source node in the network and a column for each destination node in the network and wherein a table entry located at an entry row and an entry column identifies a link that can be used to send data from the source node in the entry row to the destination node in the entry column, comprising routing logic operable to:

form an ordered set of deadlock-free sub-topologies of said network, each sub-topology comprising links that are not used in any other sub-topology;

generate said routing table as a function of said ordered set of deadlock-fee sub-topologies;

add to the routing table, a row including a plurality of entries, each entry identifying a link that directly connects the new node to a neighbor node that can be connected, via existing deadlock-free paths described by the table, to a destination node associated with the entry column; and add to the routing table a column including a plurality of entries, each entry identifying a link that can be used to connect a source node associated with the entry row, via existing deadlock-free paths described by the table, to a neighbor node that can be directly connected to the new node, wherein the paths defined in the routing table continue to define deadlock-free paths in the network after addition of the row and column for the new node.

13. The system of claim 12, wherein said routing logic comprises at least one digital logic circuit.

14. The system of claim 12, wherein said routing logic comprises program code loaded into a memory of a computer system.

15. A system for adding routing information for a new node to a routing table with a plurality of entries that reflect an existing deadlock-free set of paths through a network of nodes, wherein the routing table has a row for each source node in the network and a column for each destination node in the network and wherein a table entry located at an entry row and an entry column identifies a link that can be used to send data from the source node in the entry row to the destination node in the entry column, comprising:

means for forming an ordered set of deadlock-free sub-topologies of said network, each sub-topology comprising links that are not used in any other sub-topology;

means for generating said routing table as a function of said ordered set of deadlock-free sub-topologies;

means for adding to the routing table, a row including a plurality of entries, each entry identifying a link that directly connects the new node to a neighbor node that can be connected, via existing deadlock-free paths described by the table, to a destination node associated with the entry column; and means for adding to the routing table a column including a plurality of entries, each entry identifying a link that can be used to connect a source node associated with the entry row, via existing deadlock-free paths described by the table, to a neighbor node that can be directly connected to the new node, wherein the paths defined in the routing table continue to define deadlock-free paths in the network after addition of the row and column for the new node.

16. A computer program product including a computer readable medium, said computer readable medium having a computer program stored thereon, said computer program for adding routing information for a node to a routing table, wherein said routing table includes routing information reflecting an existing deadlock-free set of paths through a network of nodes, said computer program comprising:

program code for forming an ordered set of deadlock-free sub-topologies of said network, each sub-topology comprising links that are not used in any other sub-topology;

program code for generating said routing table as a function of said ordered set of deadlock-free sub-topologies;

program code for adding to the routing table, a row including a plurality of entries, each entry identifying a link that directly connects the new node to a neighbor node that can be connected, via existing deadlock-free paths described by the table, to a destination node associated with the entry column; and program code for adding to the routing table a column including a plurality of entries, each entry identifying a link that can be used to connect a source node associated with the entry row, via existing deadlock-free paths described by the table, to a neighbor node that can be directly connected to the new node, wherein the paths defined in the routing table continue to define deadlock-free paths in the network after addition of the row and column for the new node.

* * * * *